Nov. 15, 1927.  1,649,119

H. A. KJELSBERG

FLEXIBLE SHAFT

Filed April 26, 1923

WITNESSES:
Thomas H English.
W B Jaspert.

INVENTOR
Harald A. Kjelsberg.
BY
ATTORNEY

Patented Nov. 15, 1927.

1,649,119

UNITED STATES PATENT OFFICE.

HARALD A. KJELSBERG, OF WILKINSBURG, PENNSYLVANIA, ASSIGNOR TO WESTINGHOUSE ELECTRIC & MANUFACTURING COMPANY, A CORPORATION OF PENNSYLVANIA.

FLEXIBLE SHAFT.

Application filed April 26, 1923. Serial No. 634,725.

My invention relates to flexible-drive mechanisms, more especially to a flexible-drive element associated with electric motors employed where inertia forces are involved, as in electrically propelled railway vehicles.

It is among the objects of this invention to provide a flexible-drive mechanism which shall be of simple, compact structure, and which shall be relatively flexible and capable of absorbing shock and impact which would otherwise be transmitted to the driving member.

It is a further object of this invention to provide a device of the above-indicated character which shall be adapted to equalize the load or torque at its respective ends to produce equal wear in its respective operating parts.

Various types of flexible-drive mechanisms embodying torsional deflecting shafts have been proposed, some of which embody yielding spring elements therein and others consisting of a drive shaft of relatively small diameter secured in such manner as to provide a relatively long extending portion which is adapted to torsionally flex under load.

My present invention is directed to the latter type of drive mechanism embodying one or more torsionally deflecting shaft members having reduced body portions secured in or to driving members and adapted to engage drive shaft gears or other driven members at their free ends. I propose to utilize anti-friction bearing members to support the flexible shafts intermediate their working ends and their respective supports.

Figure 1:
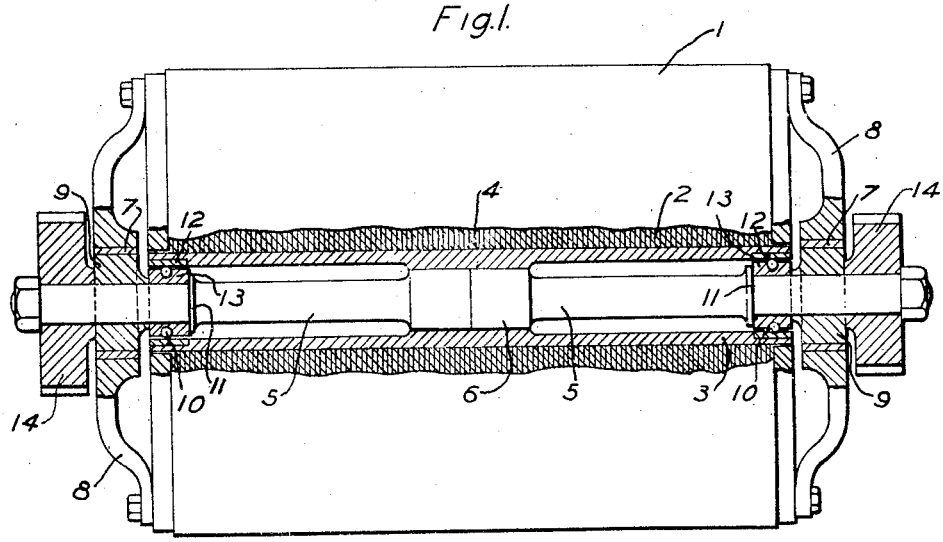
Figure 2:
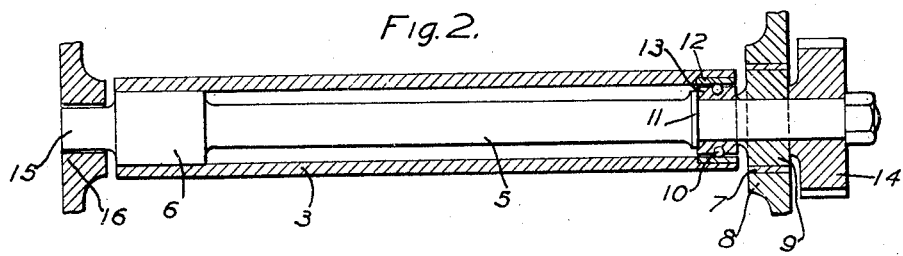

In the accompanying drawing constituting a part hereof and in which like reference characters designate like parts, Figure 1 is a longitudinal sectional view, partially in elevation, of a flexible-drive mechanism embodying the principles of my invention; and Fig. 2 is a similar view illustrating another embodiment of this invention.

Referring to Fig. 1, the device therein illustrated comprises an electric motor 1 containing the usual armature 2 that is provided with a hollow shaft or drive sleeve 3 having a constricted central portion 4. A flexible shaft 5 having an expanded central portion 6 is symmetrically disposed within the hollow shaft 3 and secured thereto by a press fit or key at its central portion 4. The reduced end portions 5 extend longitudinally of the armature shaft and are journaled by a plurality of outboard bearings 7 constituting the end brackets 8 of the motor.

The bearing members comprise sleeves 9, adapted to be secured on ends of the shaft 5 which are further provided with anti-friction bearings 10 of the usual roller or ball-bearing type which bear against the shoulders 11 of the shafts 5 and the sleeves 9. The outer races 12 of the bearings 10 are secured by a snug fit into the counterbored portions of the hollow shaft 3 and the inner races 13 are secured to the reduced ends of the shaft 5. Pinion members or gear wheels 14 or other driving elements, such as cranks, may be secured at the ends of the shaft 5, outside of the journal bearings 7.

In Fig. 2, a shaft 5 having an expanded end portion 6 may be substituted for the shaft shown in Fig. 1 and it may be secured in the armature shaft 3 and journal bearings of the motor bracket 8 in a manner similar to that described above, the only variation being the journaling of the small end 15 of the shaft in a slightly modified form of bracket frame 16 and securing the expanded end 6 on one end of the hollow shaft 3. The anti-friction bearing 10 is utilized in the same manner for supporting the reduced portion of the shaft within the armature shaft 3.

The operation of this device is briefly as follows: The flexible shaft 5 is driven by the armature 2 of the motor by the press fit or other manner of mounting at its expanded portion 6. The torque is transmitted to the gear wheels 14, and the flexible shafts by virtue of their reduced relatively long body portions, are adapted to be torsionally flexible under shock or impact transmitted by the driven members (not shown). The anti-friction bearings 10 function to support the shafts 5 at the portion of excessive strain to eliminate bending and distortion of the same, the effect of the compound bearings being to provide a stable drive with an anti-friction support to produce smoothness of operation with the least resistance to the free torsional flexing of the drive members.

In the double flexing shaft design illustrated in Fig. 1, there is an equalizing action between the respective drive gears due to their being actuated from a common source; namely, the armature member. In the design illustrated in Fig. 2, the flexible shaft member having a relatively long body portion will provide considerably more flexing than the shorter members of the shaft, Fig. 1, and the particular type to be used will depend on the specific application and operating conditions to which it will be subjected.

It will be obvious, from the above description of my invention, that the flexible drive elements embodied therein provide an efficient, durable and compact drive mechanism which is applicable to a variety of uses but particularly to the driving of electrical railway vehicles where the operating stresses are especially severe and it is essential to provide a flexible member intermediate the driving mechanism and the operating parts.

Although I have described a specific embodiment of my invention, it will be obvious to those skilled in the art that various modifications may be made in the details of construction without departing from the principles herein set forth. For instance, in general, the motor and armature may be of any suitable construction, and the journal bearings of the flexible shaft members may be designed to adapt the device for specific uses. The anti-friction bearings may be disposed at any portion of the flexible shaft members or these bearings may be employed in multiple instead of the manner herein illustrated.

I claim as my invention:

1. A flexible-drive mechanism comprising a driving sleeve, a shaft having an expanded portion secured to said sleeve and journalled at its ends independently thereof and anti-friction bearings for supporting said shaft within said sleeve.

2. A flexible drive mechanism comprising a driving sleeve, a shaft having an expanded portion secured to said sleeve and journalled independently thereof and anti-friction bearings disposed intermediate the journal and expanded shaft portion for supporting said shaft within said sleeve.

3. A flexible drive mechanism comprising a driving sleeve, a shaft having an expanded body portion secured centrally of said sleeve and journalled at its free ends independently of said sleeve and anti-friction bearings for supporting said shaft within said sleeve.

4. The combination with an electric motor, of a hollow armature shaft, a torsionally flexible shaft secured centrally of said hollow shaft and journalled in the end brackets of the motor frame and anti-friction bearings secured at the ends of said armature shaft and adapted to engage the ends of said torsional shaft.

5. The combination with an electric motor, of a hollow armature shaft, a flexible shaft having reduced end portions, said flexible shaft being secured centrally of said armature shaft and journalled at its free ends in the end brackets of the motor frame and anti-friction bearings secured at the ends of said armature shaft adapted to rotatably support said flexible shaft.

6. The combination with an electric motor, of a hollow armature shaft, and a flexible shaft having a reduced body portion, said flexible shaft being secured at one end in said armature shaft and supported therein at its other end by an anti-friction bearing.

7. The combination with an electric motor, of a hollow armature shaft, and a flexible shaft having a reduced body portion, said flexible shaft being secured at one end in said armature shaft and supported therein at its other end by an anti-friction bearing, said flexible shaft being journalled independently of said armature shaft.

8. The combination with an electric motor, of a hollow armature shaft, and a flexible shaft having reduced end portions, said flexible shaft being secured centrally of said armature shaft and supported therein at its free ends by anti-friction bearings.

In testimony whereof, I have hereunto subscribed my name this 20th day of April, 1923.

HARALD A. KJELSBERG.